Jan. 27, 1931.   R. A. LINCOLN   1,790,384
STOPCOCK
Filed Aug. 2, 1927

Robert A. Lincoln, Inventor

By Jesse R. Stone

Attorney

Patented Jan. 27, 1931

1,790,384

UNITED STATES PATENT OFFICE

ROBERT A. LINCOLN, OF PAMPA, TEXAS

STOPCOCK

Application filed August 2, 1927. Serial No. 210,050.

My invention relates to stop cocks and pertains particularly to the means for operating the valve therein so as to assure a tight closure thereof and also assure that the same be capable of operation easily at any time.

It is an object of the invention to provide a stop cock which will be capable of tight closure so that no leakage will occur, and also be easy to open and close when desired. It is desired that the valve be capable of operation from one end thereof so as to make it more readily accessible when operation is necessary.

Figure 1:
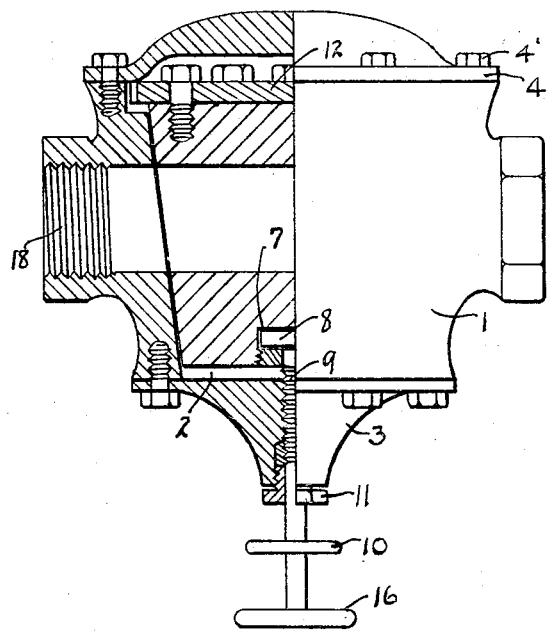
Figure 2:
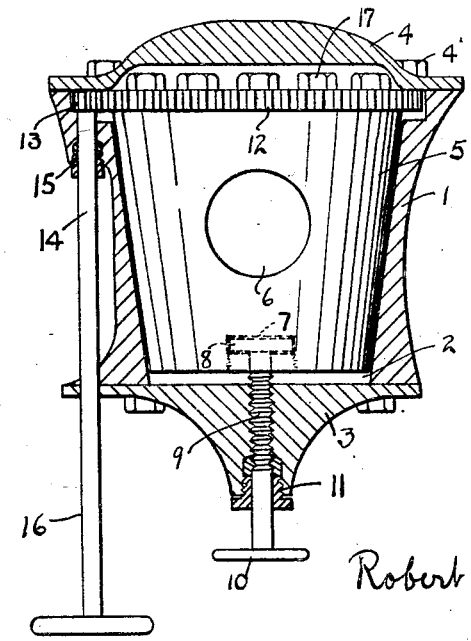

In the drawing herewith, Fig. 1 is a side view of a stop cock involving my invention, part of the view being in central longitudinal section. Fig. 2 is a longitudinal section taken at right angles to the view shown in Fig. 1.

The cock comprises a housing 1 of the usual form, tapered from the upper end to the lower end thereof. There is a central chamber within the housing 1 tapered toward the lower end and adapted to house a core 5, said core having a transverse opening 6 therethrough for the passage of liquid. The lower end of the chamber 2 is closed by a plate 3 which is connected tightly to the housing by means of cap screws in the usual manner.

There is a central opening extending longitudinally through the plate 3, said opening being threaded to receive a rod 9 adapted to screw therein and the smooth outer end has a stuffing box 11 around the same to make a fluid tight closure with the valve rod. The upper end of the valve rod is fitted within a recess 7 in the valve core, the end 8 having a radial flange thereon fitting within the valve recess and held rotatably in place by means of a threaded ring. Thus, it will be seen that the rotation of the valve rod 9 by means of a handle 10 on the lower end thereof will screw the said rod upwardly or downwardly, depending upon the direction of rotation, so as to adjust the valve core 5, as desired.

The upper end of the housing 1 is provided with a plate 4 forming a cap enclosing the upper end of the valve and secured in place by cap screws 4', making a fluid tight closure for the valve chamber 2.

Below the plate 4 the valve is provided with a toothed plate 12 which is secured on the valve core by means of cap screws. The margin of the plate is toothed, as indicated in Fig. 2, to engage with a smaller gear 13 at the upper end of an operating shaft 14.

The shaft 14 serves to rotate the valve core 5. It is journaled at its lower end within the plate 3 and at its upper end within the upper wall of the housing secured fluid tight therein by means of a stuffing box 15. The shaft 14 may be rotated by means of the handle 16 so as to operate the gear 13 and through said gear to rotate the plate 12 and the valve core 5.

It will be obvious that the valve core may be moved upwardly by means of the shaft 9 so as to be freely movable in the chamber 2 whenever it is to be rotated, and it may thereafter be operated by means of the shaft 16, as described. When arranged in adjusted position, the valve may be again tightly seated to avoid any danger of leakage by drawing the valve core 5 tightly into its seat by means of the valve rod 9. It is to be noted that the valve core may be moved out of its seat so as to be again rotated with very little difficulty. It will not be necessary to use a hammer or other similar means such as is usually employed to loosen the cock when it is to be adjusted. This may be done by the simple rotation of the shaft 9.

The further advantages of the device will be obvious, and although I have described the same as being set in a position with the valve core vertically arranged, it is to be understood that the same is adapted to be fixed in any position and will operate with equal efficiency in any position.

Having thus described my invention, what I claim as new and desire to protect by Letters Patent is:

A stop cock comprising a housing, a pair of intersecting passages therethru, a tapered valve core in one of said passages, cap members to close the passage containing said core, an adjusting rod threaded thru one of said caps whereby said core may be longitudinally moved to permit or prevent rotation thereof, a stuffing box about said rod, a gear carried by the larger end of said core and arranged beneath one of said caps, a pinion gear meshing with said first gear whereby said valve core may be rotated, and a shaft to rotate said pinion supported by said housing and extending therefrom at the same end as said adjusting rod.

In testimony whereof I hereunto affix my signature this 28th day of July, A. D. 1927.

ROBERT A. LINCOLN.